United States Patent [19]

Gibsen et al.

[11] 3,717,452

[45] Feb. 20, 1973

[54] APPLYING AGRICULTURAL CHEMICALS WITH XANTHOMONES HYDROPHILLIC COLLOIDS

[75] Inventors: Kenneth F. Gibsen; Arthur W. Saddington, both of San Diego, Calif.

[73] Assignee: Kelco Company, San Diego, Calif.

[22] Filed: Jan. 16, 1970

[21] Appl. No.: 4,469

Related U.S. Application Data

[63] Continuation of Ser. No. 759,203, Sept. 11, 1968, abandoned, which is a continuation-in-part of Ser. No. 392,300, Aug. 26, 1964, abandoned.

[52] U.S. Cl. ..........................71/117, 71/65, 71/79, 71/DIG. 1, 424/127, 424/167, 424/361, 424/362, 424/363
[51] Int. Cl. ..............................................A01n 17/10
[58] Field of Search..............71/117: DIG. 1, 65, 79; 424/361; 195/31 P

[56] References Cited

UNITED STATES PATENTS

| 2,786,011 | 3/1957 | Novak | 424/186 |
|---|---|---|---|
| 3,258,326 | 6/1966 | Rabussier | 71/93 |
| 3,143,407 | 8/1964 | Mitchell et al. | 71/80 |
| 3,060,084 | 10/1962 | Littler | 71/DIG. 1 |
| 3,157,486 | 11/1964 | Harrison et al. | 71/DIG. 1 |
| 3,000,790 | 9/1961 | Jeanes et al. | 195/31 |
| 3,271,267 | 9/1966 | Weber et al. | 195/31 |
| 3,355,447 | 11/1967 | O'Connell | 195/31 |

FOREIGN PATENTS OR APPLICATIONS

| 630,023 | 10/1949 | Great Britain | 71/DIG. 1 |

*Primary Examiner*—Lewis Gotts
*Assistant Examiner*—G. Hollrah
*Attorney*—Elwood S. Kendrick, Thomas H. Jones and Kendrick and Subkow

[57] ABSTRACT

Method of applying agricultural chemicals by forming an admixture of an agricultural chemical, an aqueous carrier therefor, and a Xanthomonas colloid in an amount in the range of 0.02 percent to 2.0 percent by weight of the aqueous component, and applying the agricultural chemical. As a new composition, an agricultural chemical, an aqueous carrier therefor, and from 0.2 percent to 2.0 percent by weight of the aqueous component of a Xanthomonas hydrophilic colloid.

7 Claims, No Drawings

APPLYING AGRICULTURAL CHEMICALS WITH XANTHOMONES HYDROPHILLIC COLLOIDS

This application is a continuation of our prior copending application Ser. No. 759,203, filed Sept. 11 1968 and now abandoned, which in turn is a continuation-in-part of our prior application Ser. No. 392,300, filed Aug. 26, 1964 and now abandoned.

This invention relates to a new and useful method of applying agricultural chemicals.

Horticulturalists are regularly concerned with protecting or controlling the growth of plants. To accomplish such a purpose they spray coat plants with agricultural chemicals such as pesticides, fungicides, growth modifiers to promote growth of plants, or herbicides to kill undesired plant life commonly known as weeds. Other agricultural chemicals are used to kill insects and pests such as flies, mosquitos, mites, ticks, weevils, termites, lice, and nematodes. In the following and in the appended claims the words "agricultural chemicals" are intended to include all of the foregoing.

Agricultural chemicals are commonly applied in water solutions, suspensions or emulsions in treating plant life. Said applications are made to root, stem, foliage, fruit, or flower depending upon the object to be accomplished by the particular treatment. To be effective, the treating materials must remain in contact with the plant life to which they are applied. In addition, it is usually very undesirable for these treating materials to drift onto neighboring areas. For example, it is common to spray such treating materials to the planted areas along highways, freeways, and the like. If the active ingredient in the spray drains from the growth, much of it is wasted and its effectiveness dissipated. At the same time if the spray, for example, is herbicide and it drifts onto neighboring farmland it can destroy valuable crops. Similarly, the effectiveness of agricultural chemicals when applied to pests or animals or other objects is increased when the chemicals adhere to the animal or object being treated.

It is an object of our invention to provide a new and useful method of applying agricultural chemicals.

It is a further object of our invention to provide a method of increasing the adherence of agricultural chemicals to plants, animals and surfaces treated therewith.

It is still another object of our invention to provide a method of applying treating materials to plant life that is capable of confining the applied treating materials to plants in a given area.

It is still an additional object of our invention to increase the efficiency of the application of agricultural chemicals.

In accordance with our invention we have surprisingly found that one or more of the foregoing objectives may be obtained by incorporating a relatively small amount of a Xanthomonas hydrophilic colloid in aqueous carriers for agricultural chemicals. Suitable amounts of such a colloid for our purpose are in the range of 0.02 to 2.0 percent by weight of the aqueous component of said carrier. Amounts in the range of 0.1 to 1.0 percent of said colloids by weight of the aqueous component of the aforesaid carrier are preferred.

For example, to use our method in applying an agricultural chemical, such as a herbicide, to plant life we may disperse or dissolve *Xanthomonas campestris* hydrophilic colloid in water at a concentration of one-half to 1 percent by weight although much lower levels are often usable. To this solution or dispersion so produced we may add 1 percent of the soluble dimethylamine salt of 2,4-dichlorophenoxyacetic acid, a well known herbicide. The water soluble *Xanthomonas campestris* hydrophilic colloid herbicide solution so produced while considerably thicker than water will have a viscosity within the exemplary range of 400 to 1,200 centipoises. Such a solution surprisingly is easily pumpable with equipment used in the commercial application of herbicides.

We find that a particularly effective preparation is attained if the *Xanthomonas campestris* hydrophilic colloid is used at 0.7 percent by weight of the water in the aqueous solution and the herbicide is used at a concentration of about 1 percent by weight. This exemplary mixture has a number of highly special and very effective properties. In the first place it will stick to surfaces of plant life of varying shapes and sizes including trees, shrubs, and vegetables as well as to portions thereof. Thus, for example, our preparation will adhere to roots, stems, leaves, flowers, and fruit. Additionally, because of the very viscous consistency of the mixture relatively thick layers are formed on the plant, which serve to maintain a relatively large quantity of water and herbicide at and on the plant surface to be treated. Moreover, the thick adhesive coating serves to retard not only runoff of the herbicide solution but also evaporation, thereby increasing the effectiveness of the herbicidal action.

In the aforementioned example of our invention employing a Xanthomonas hydrophilic colloid, we refer to such a colloid produced by the bacterium *Xanthomonas campestris*. This colloidal material is a polymer containing mannose, glucose, potassium glucuronate and acetyl radicals. In such a colloid, the potassium portion can be replaced by several other cations without substantial change in the property of the said material for my purpose.

The said colloid, which is a high molecular weight, exocellular material, may be prepared by the bacterium *Xanthomonas campestris*, by whole culture fermentation of a medium containing 2–5 percent commercial glucose, organic nitrogen source, dipotassium hydrogen phosphate and appropriate trace elements. The incubation time is approximately 96 hours at 28°C., aerobic conditions. In preparing the colloid as aforesaid, it is convenient to use corn steep liquor or distillers' dry solubles as an organic nitrogen source. It is expedient to grow the culture in two intermediate stages prior to the final inoculation in order to encourage vigorous growth of the bacteria. These stages may be carried out in media having a pH of about 7. In a first stage a transfer from an agar slant to a dilute glucose broth may be made and the bacteria cultured for 24 hours under vigorous agitation and aeration at a temperature of about 30°C. The culture so produced may then be used to inoculate a higher glucose (3 percent) content broth of larger volume in a second intermediate stage. In this stage the reaction may be permitted to continue for 24 hours under the same conditions as the first stage. The culture so acclimated for use with glucose by the aforementioned first and second stages is then added to the final glucose medium. In the aforesaid method of preparing *Xanthomonas*

*campestris* hydrophilic colloid, a loopful of organism from the agar slant is adequate for the first stage comprising 200 milliliters of the said glucose media. In the second stage the material resulting from the first stage may be used together with 9 times its volume of a 3 percent glucose media. In the final stage the material produced in the second stage may be admixed with 19 times its volume of the final media. A good final media may contain 3 percent glucose, 0.5 percent distillers' dry solubles, 0.5 percent dipotassium phosphate, 0.1 percent magnesium sulphate having 7 molecules of water of crystallization and water. The reaction in the final stage may be satisfactorily carried out for 96 hours at 30°C. with vigorous agitation and aeration. The resulting *Xanthomonas campestris* colloidal material which we have found to be particularly suitable for our purpose can be recovered by precipitation in methanol of the clarified mixture, i.e., the filtered or centrifuged mixture, from the fermentation. This resulting material may also be designated as a pseudoplastic, heteropolysaccharide hydrophilic colloid or gum produced by the bacterium species *Xanthomonas campestris*.

Additionally, the reaction mixture containing the Xanthomonas hydrophilic colloid, as described above, can be dried as by passing the reaction mixture onto a drum dryer and removing the Xanthomonas colloid and any solid impurities present therewith from the drum with a doctor blade. Still further, the Xanthomonas colloid in the reaction mixture, i.e., the fermentation beer, can be treated with an alkali metal hypochlorite as described in U.S. application Ser. No. 697,034, filed Jan. 11, 1968, now U.S. Pat. No. 3,516,983 to oxidize proteinaceous impurities followed by precipitation. of the colloid through addition of a lower alcohol. The description set forth in U.S. application Ser. No. 697,034, now U.S. Pat. No. 3,516,983 is incorporated herein by reference.

Additional Xanthomonas colloidal material may be prepared by repeating the procedure used for producing the *Xanthomonas campestris* colloidal material described above by substituting known Xanthomonas bacteria or organisms, i.e., *Xanthomonas carotae*, *Xanthomonas incanae Xanthomonas begoniae*, and *Xanthomonas malvacearum*, for the bacterium, *Xanthomonas campestris*. In using Xanthomonas colloidal material produced by the Xanthomonas bacteria as aforementioned other than *Xanthomonas campestris* we vary the quantity of the Xanthomonas colloid used in our method depending upon the particular species. More particularly, we have found that when using a Xanthomonas colloid produced by the organism *Xanthomonas carotae*, we required 1.9 parts of said colloid as a substitute for each part of a colloid produced by the bacterium *Xanthomonas campestris*. Similarly, when substituting the colloid produced by the bacterium *Xanthomonas incanae*, 1.5 parts were required; when substituting *Xanthomonas begoniae*, 1.65 parts were required, and when substituting *Xanthomonas malvacearum*, 1.25 parts were required.

In the foregoing example of applying an agricultural chemical we have made reference to applying a herbicide to plant life. The surprising effectiveness of our method for this purpose also pertains to using agricultural chemicals in aqueous solutions, suspensions or emulsions as sprays for animals, insect control, and the like.

Our method may be used in applying treating materials by both surface and airborne equipment.

It will be noted in using the invention of our method in applying agricultural chemicals that the solutions, suspensions and/or emulsions initially prepared in accordance therewith are relatively viscous as measured on a Brookfield Viscometer or similar instrument. Surprisingly, however, when subjected to pump pressure and the like they have a fluidity approaching a low viscosity material. Further, on leaving the ejection nozzles these materials return to a viscous character that confines the stream to the area intended to be treated even under adverse conditions. Thus, for example, as the stream of a herbicide utilizing our method strikes plant leaves, stems, etc. it flows readily for an instant of time and provides a thorough coating on all sides. However, moments after coating the surfaces involved, the consistency turns to one of extremely high viscosity which prevents the herbicide from running off. The practical significance of our method is that agricultural chemicals utilizing aqueous carriers can be prepared conveniently, transferred readily, pumped and sprayed easily. Still further, a spray thereof will resist wind drift, coat the intended surface thoroughly, maintain said coating tenaciously and thereby make an effective and extensive application of the active ingredients on the desired surfaces without waste due to draining or damage due to drift to surrounding areas.

These treating materials to which our invention is applicable are sold as solids in crystal and powder form and as liquids. It will be appreciated by those skilled in the art that in preparing the aqueous admixture of a water soluble Xanthomonas hydrophilic colloid and a treating material in order to provide a relatively uniform admixture it may be necessary or desirable to use known stabilizers, sequestering and/or emulsifying agents in said treating material admixture.

It will be still further appreciated by those skilled in the art that there are a wide variety of agricultural chemicals and mixtures thereof and carriers or extenders therefor, to which the instant invention is applicable. In the following, we set forth examples of chemicals that might be used in accordance with our method.

EXAMPLE I: HERBICIDES dimethyl-2, 3, 5, 6, - tetrachloroterephthalate.
2,2-dichloropropionic acid, sodium salt
2,4,5-trichlorophenoxyacetic acid, salts and esters thereof.
2-(2,4-dichloro phenoxy) propionic acid
2,4-dichlorophenoxyacetic acid, salts and esters thereof

EXAMPLE II: FUNGICIDES

N-trichloromethylmercapto-4-cyclohexene-1,2-dicarboximide; tetramethyl thiuram disulfide 1,2,3,4,5,6-hexachlorobenzene disodium ethyl bisdithiocarbamate

EXAMPLE III: INSECTICIDES 1,2,4,5,6,7,8,8-octachloro-3a,4,7 7a-tetrahydro-4, 7-methanoindane
1,1,1-trichloro-2,2-bis(p-chlorophenyl)-ethane, 75 percent; remainder largely O,P' isomer
1,2,3,4,5,6-hexachlorocyclohexane containing at least 99 percent gamma isomer
O,O-dimethyl S-(1,2-dicarbethoxyethyl) phosphorodithioate
3-(1-methyl-2-pyrrolidyl)pyridine

EXAMPLE IV: MITICIDES 2-(p-tert-butylphenoxy)-isopropyl 2-chloroethyl sulfite
p-chlorophenyl p-chlorobenzenesulfonate tetraethyl pyrophosphate
O,O-diethyl s-(p-chlorophenylthiomethyl) phosphorodithioate

EXAMPLE V: GROWTH CONTROL AGENTS tributyl 2,4-dichlorobenylphosphonium chloride
2-(3-indole)butyric acid
1,2-dihydro-pyridazine-3,6-dione To further demonstrate the surprising nature of our invention in terms of reducing drainage from a treated surface, various aqueous solutions were prepared, each of which was thickened to a viscosity of 1,000 cps.± 10 cps by the addition of a particular thickener and also contained 2 percent by weight of the herbicidally active dimethyl amine salt of 2,4-dichlorophenoxyacetic acid. Each of the thickened test solutions was tested by placing 50.0 grams of the solution on a flat, somewhat waxy surface inclined approximately 30° from the horizontal plane. The solution under test was then allowed to drain for 30 minutes and the loss of solution from the surface was determined. The results of these tests are set forth in the following Table I in which the thickener present in the test solution is set forth in column 1, the percent by weight of solution remaining on the inclined surface at the end of the test (percent retention) is set forth in column 2, and the average percent retention for the two tests is set forth in column 3.

TABLE I

| Thickener | Percent Retention | Average percent retention |
|---|---|---|
| High Viscosity Sodium Alginate | 16.6 | |
| | 17.8 | 17.2 |
| Xanthomonas Campestris Hydrophilic Colloid | 85.4 | |
| | 93.8 | 89.6 |
| Hydroxyethylcellulose | 7.6 | |
| | 9.6 | 8.6 |
| Guar Gum | 25.6 | |
| | 27.6 | 26.6 |
| Gum Tragacanth | 29.8 | |
| | 33.0 | 31.4 |

As shown by the above data, the percent retention of the test solutions containing a Xanthomonas colloid was almost three times that of the solutions containing gum tragacanth and more than ten times that of the solutions containing hydroxyethylcellulose. The fact that the test solutions containing a Xanthomonas hydrophilic colloid were so resistant to drainage is, of course, of great significance in the treatment of plants or animals with an agricultural chemical since the effectiveness of the agricultural chemical is increased in direct proportion to its percent retention of the treated object.

In still further tests aqueous solutions containing various thickeners were prepared at viscosities of 500 cps and 1,000 cps. Each of the test solutions was then pumped through a gear pump at close to the maximum flow rate obtainable. Both the flow rate and the pumping pressure were measured for each of the solutions under test. The results are shown in the following Table II in which the thickener employed is set forth in column 1, the viscosity of the test solution in centipoises is set forth in column 2, the pumping pressure is set forth in column 3 and the flow rate in gallons per minute is set forth in Column 4.

TABLE II

| Thickener | Viscosity (cps) | Pressure (psig) | Flow Rate (Gal. min) |
|---|---|---|---|
| Xanthomonas Campestris Hydrophilic Colloid | 1,000 | 6.5 | 12.8 |
| " | 500 | 5.0 | 14.0 |
| Sodium Alginate | 1,000 | 15.0 | 5.4 |
| " | 500 | 9.0 | 6.3 |
| Hydroxyethyl Cellulose | 1,000 | 15.0 | 8.3 |
| " | 500 | 9.0 | 7.2 |

As shown in the above table, the test solutions containing Xanthomonas Hydrophilic Colloid exhibited greater flow rates at lower pumping pressures than the solutions containing sodium alginate or Hydroxyethyl Cellulose. Moreover, the 1,000 cps test solution containing Xanthomonas Hydrophilic Colloid was more easily pumped than the 500 cps test solutions containing sodium alginate or hydroxyethyl cellulose. This, of course, is of great significance in the use of our invention in applying an agricultural chemical since it permits the pumping and spraying of a very viscous aqueous solution or suspension of the agricultural chemical in a manner which is impossible when using conventional thickeners such as alginates or hydroxyethyl cellulose.

We claim:

1. In a viscous liquid composition for agricultural spraying, having a viscosity within the range of 400 to 1,200 centipoises and showing a decrease in viscosity when subjected to shear, thereby improving its ability to be pumped and to be sprayed, which composition comprises water and an effective amount of a chemical selected from the class of pesticides and growth modifiers, the improvement consisting essentially of having incorporated therein from 0.02 to 2.0 percent by weight of said water of Xanthomonas hydrophilic colloid.

2. The composition of claim 1 wherein said colloid is *Xanthomonas campestris* hydrophilic colloid.

3. The composition of claim 2 wherein the amount of said colloid is 0.1 to 1.0 percent.

4. The agricultural growth modifier composition of claim 1 having a viscosity of about 1,000 centipoises consisting of water, *Xanthomonas campestris* hydrophilic colloid, and 2 percent by weight of dimethylamine salt of 2,4-dichlorophenoxy acetic acid.

5. A method of retarding the runoff and evaporation of agricultural pesticide and growth modifier solutions applied to surfaces, which method comprises spraying a viscous liquid composition, having a viscosity within the range of 400 to 1200 centipoises, containing an effective amount of a chemical selected from the class consisting of pesticides and growth modifiers, and a water solution of Xanthomonas hydrophilic colloid, the amount of said colloid being from 0.02 to 2.0 percent.

6. The method of claim 5 wherein said colloid is *Xanthomonas campestris* hydrophilic colloid.

7. The method of claim 6 wherein the amount of said colloid is 0.1 to 1.0 percent.

* * * * *